D. I. PAISNER.
VEHICLE WHEEL.
APPLICATION FILED JAN. 21, 1908.
935,399.
Patented Sept. 28, 1909.
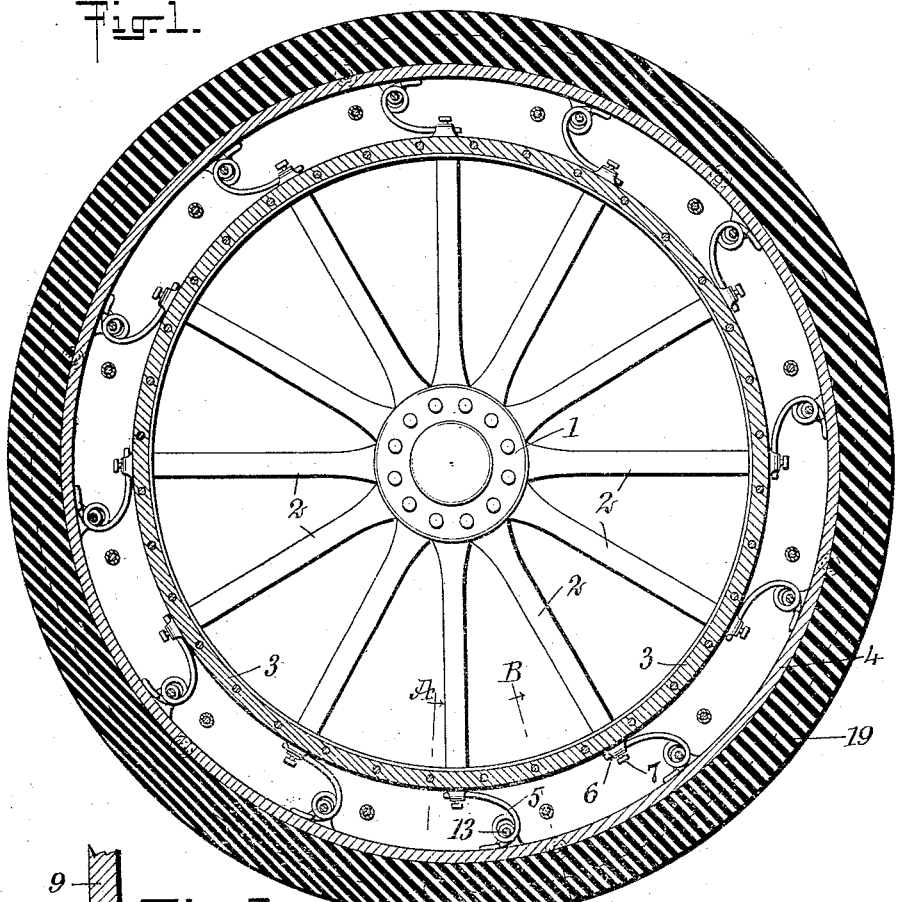
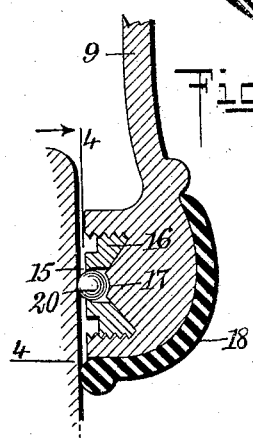
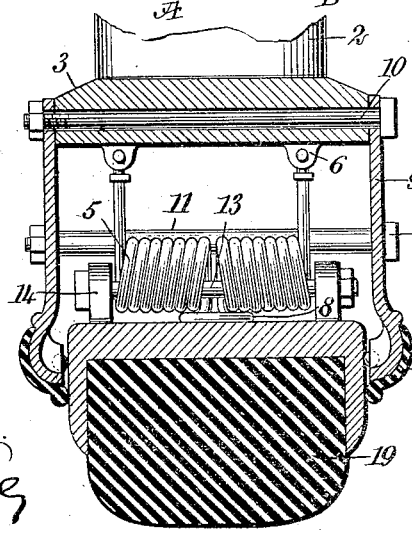
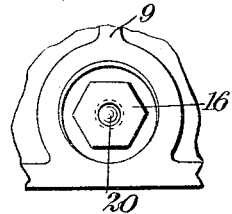
WITNESSES
INVENTOR
David I. Paisner
BY Munn & Co
ATTORNEYS

UNITED STATES PATENT OFFICE.

DAVID I. PAISNER, OF CHELSEA, MASSACHUSETTS, ASSIGNOR OF ONE-HALF TO LOUIS SEDER, OF CHELSEA, MASSACHUSETTS.

VEHICLE-WHEEL.

935,399.  Specification of Letters Patent.  Patented Sept. 28, 1909.

Application filed January 21, 1908. Serial No. 411,890.

*To all whom it may concern:*

Be it known that I, DAVID I. PAISNER, a citizen of the United States, and a resident of Chelsea, in the county of Suffolk and State of Massachusetts, have invented a new and Improved Vehicle-Wheel, of which the following is a full, clear, and exact description.

My invention relates to vehicle wheels, and has for its principal object to provide a wheel which will have all the resiliency of a wheel with a pneumatic tire, without the disadvantages.

Another object is to provide a vehicle wheel with two rims which are separated and held normally in their relative positions by springs and guides, which will not only permit the outer rim to move toward the inner rim and thus furnish the resiliency desired, but will also permit the outer rim to rotate slightly, relatively to the inner rim and thus furnish additional resiliency.

In the drawings, I have drawn one embodiment of my invention which I will now describe, but I do not limit myself thereto as I consider myself entitled to all forms and embodiments of the invention which may fall within the scope of the appended claims.

Reference is to be had to the accompanying drawings forming a part of this specification, in which similar characters of reference indicate corresponding parts in all the figures.

Figure 1 is a side, sectional elevation showing the inner and outer rims and the position of the springs therebetween. Fig. 2 is an enlarged fragmentary sectional view showing the method of assembling the springs, and the inner and outer rims, and the devices by which they are secured, the view being taken of the fragment between the lines A—A and B—B in Fig. 1. Fig. 3 is an enlarged sectional view of the shields and the ball bearings which prevent friction between the shields and the outer rim, and Fig. 4 is a view of the ball bearing on the shield on line 4—4 in Fig. 3.

By referring to the drawings, it will be seen that 1 is the hub and 2 are the spokes, which are rigidly secured to the inner rim 3. Between the inner rim 3 and the outer rim 4 are disposed a plurality of double helical springs 5, which are firmly secured to the outer rim and which press against the inner rim. The inner terminals of the springs pass through elongated eyes 6 and are held by screws 7 which fit threads in the outer sides of the said elongated eyes. By this construction, the inner and outer rims may be quickly separated, when it is necessary to make repairs.

Referring more particularly to Fig. 2, it will be seen that the two terminals of each spring 5 are oppositely disposed in the elongated eyes 6 on the inner rim 3, and that the spring is wound in opposite directions with the central portion 8 in the form of a loop which lies against the outer rim 4. The helical springs 5 are held in place by bars 13 which are secured to bearings 14 which are made fast to the outer rim 4.

As will be seen, the spring is so adjusted that the outer rim may move inwardly, or it may rotate slightly around the inner rim 3 when the road is uneven or when an obstruction is encountered. This will give all the life to the wheels which is necessary to prevent shocks and jars to the car or carriage on which the wheels may be used. In order to keep dust from collecting between the two rims and also to prevent the outer rim from getting out of place by lateral strains, I provide annular shields 9, which are secured by bolts 10 to the inner rim 3 of the wheel. I also use tubes 11, which are disposed between the shields 9 to keep them in place, the tubes and shields being held in their normal positions by bolts 12 passing through the shields and the tubes. These tubes 11 and bolts 12 are disposed nearer to the outer rim 4 than to the inner rim 3. The outer ends of the shields 9 act as guides and have ball bearings therein which prevent friction between the outer rim 4 and the shields 9. These ball bearings 15 are preferably fitted in openings in the shields, there being projections in the openings which are frusto-conical in shape, the apexes being cut off and made concave and the walls being threaded to enable the nuts 16 to be screwed down. The inner portion of the nuts is hollowed and rounded from the inside, so that the openings will register with the concave portions 17 formed at the apex of the cone. The ball 20 is held in this bearing formed by the nut 16 and the concave portion 17 of the cones and projects slightly beyond the nut, keeping the nuts or shields from coming into contact with the outer rim 4.

A dust guard 18 may be screwed on the shields 9 to prevent dust from getting in the bearings. These bearings are disposed at regular distances on the shields, six being sufficient in most cases to meet the requirements.

The tire 19, which is solid rubber, is secured to the outer rim 4.

By this improvement, a durable wheel and tire are provided which will prevent shocks and furnish all the desired resiliency when traveling over good or bad roads. It is also possible to take the wheel apart quickly if, for any reason, the parts need to be replaced.

Having thus described my invention, I claim as new and desire to secure by Letters Patent.

1. In a vehicle wheel, outer and inner rims, helical springs having terminals disposed tangentially with reference to one of the rims and which are secured thereto, bars fixed to one of the rims, the said bars being disposed in the coils of the springs respectively to hold them in position, the diameters of the said bars being considerably less than the inner diameters of the coils of the springs, and members of the springs respectively which press against but are not secured to the other rim.

2. In a vehicle wheel, outer and inner rims, helical springs having terminals disposed tangentially with reference to one of the rims and which are secured thereto, bars fixed to one of the rims, the said bars being disposed in the coils of the springs respectively to hold them in position, the diameters of the said bars being considerably less than the inner diameters of the coils of the springs, members of the springs respectively which press against but are not secured to the other rim, and a guide which is secured to one of the rims and which prevents the lateral displacement of the other rim.

In testimony whereof I have signed my name to this specification in the presence of two subscribing witnesses.

DAVID I. PAISNER.

Witnesses:
   F. CEDER,
   LOUIS SEDER.